United States Patent
Keller et al.

(10) Patent No.: US 11,838,805 B2
(45) Date of Patent: Dec. 5, 2023

(54) TECHNIQUE FOR PREPARING USER EQUIPMENT MOBILITY

(71) Applicant: Telefonaktiebolaget LM Ericsson (publ), Stockholm (SE)

(72) Inventors: Ralf Keller, Würselen (DE); Afshin Abtin, Sollentuna (SE); Ann-Christine Sander, Skepplanda (SE)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 223 days.

(21) Appl. No.: 17/267,327

(22) PCT Filed: Aug. 21, 2018

(86) PCT No.: PCT/EP2018/072518
§ 371 (c)(1),
(2) Date: Feb. 9, 2021

(87) PCT Pub. No.: WO2020/038562
PCT Pub. Date: Feb. 27, 2020

(65) Prior Publication Data
US 2021/0345186 A1 Nov. 4, 2021

(51) Int. Cl.
*H04W 36/00* (2009.01)
*H04W 28/02* (2009.01)
*H04W 36/32* (2009.01)

(52) U.S. Cl.
CPC ............ *H04W 36/0022* (2013.01); *H04W 28/0268* (2013.01); *H04W 36/0016* (2013.01); *H04W 36/0044* (2013.01); *H04W 36/32* (2013.01)

(58) Field of Classification Search
CPC ......... H04W 36/0022; H04W 28/0268; H04W 36/0016; H04W 36/0044; H04W 36/32; H04W 76/16
(Continued)

(56) References Cited

U.S. PATENT DOCUMENTS

2009/0129342 A1* 5/2009 Hwang ............ H04W 36/0022
370/331
2011/0305222 A1 12/2011 Kotecha et al.
2021/0045018 A1* 2/2021 Xu ..................... H04W 36/14

FOREIGN PATENT DOCUMENTS

CN 102883381 A 1/2013
WO 2007144757 A2 12/2007

OTHER PUBLICATIONS

International Search Report and Written Opinion dated May 15, 2019 for International Application No. PCT/EP2018/072518 filed Aug. 21, 2018, consisting of 9-pages.
Chinese Office Action and English summary dated Aug. 1, 2023 for Application No. 201880096691.6, consisting of 14 pages.
(Continued)

*Primary Examiner* — Michael Y Mapa
(74) *Attorney, Agent, or Firm* — Christopher & Weisberg, P.A.

(57) ABSTRACT

A technique for preparing User Equipment, UE, mobility from a 4G network to a 2G/3G network for a UE moving from a 5G network to the 2G/3G network via the 4G network is disclosed. A method implementation of the technique is performed by a network node after the UE has moved from the 5G network to the 4G network and includes triggering, for each of one or more bearers handed over from the 5G network to the 4G network for the UE, an update bearer procedure to provide one or more 2G/3G Quality of Service, QoS, parameters to the UE required to hand over the respective bearer to the 2G/3G network when the UE moves from the 4G network to the 2G/3G network.

22 Claims, 8 Drawing Sheets

---

Determine whether 2G/3G QoS parameters for one or more bearers have been provided to a UE after the UE has moved from a 5G network to a 4G network ⎯ S302

Trigger, for each of the one or more bearers, an update bearer procedure to provide one or more 2G/3G QoS parameters to the UE required to hand over the one or more bearers to a 2G/3G network ⎯ S304

(58) Field of Classification Search
USPC .................................. 370/331; 455/436–444
See application file for complete search history.

(56) References Cited

OTHER PUBLICATIONS

3GPP TSG-SA2 Meeting #127bis S2-185448; Title: Capturing subsequent mobility to and from GERAN/UTRAN; Source to WG: Cisco Systems; Source to TSG: SA2; Work item code: 5GS_Ph1; Location and Date: Newport Beach, USA, May 28-Jun. 1, 2018; consisting of 3 pages.

* cited by examiner

TECHNIQUE FOR PREPARING USER EQUIPMENT MOBILITY

CROSS-REFERENCE TO RELATED APPLICATIONS

This application is a Submission Under 35 U.S.C. § 371 for U.S. National Stage Patent Application of International Application Number: PCT/EP2018/072518, filed Aug. 21, 2018 entitled "TECHNIQUE FOR PREPARING USER EQUIPMENT MOBILITY," the entirety of which is incorporated herein by reference.

TECHNICAL FIELD

The present disclosure generally relates to the field of wireless communication. In particular, a technique for preparing User Equipment (UE) mobility from a 4G network to a 2G/3G network for a UE moving from a 5G network to the 2G/3G network via the 4G network is presented. The technique may be embodied in methods, computer programs, apparatuses and systems.

BACKGROUND

Over the recent decades, several generations of mobile communication systems have been deployed. While mobile communication systems according to the first generation (1G) are generally based on analog transmission, second generation (2G) mobile communications systems have introduced—by means of the Global System for Mobile Communications (GSM) standard—digital transmission techniques for the first time. The General Packet Radio Service (GPRS) and High Speed Circuit Switched Data (HSCSD) standards—sometimes also classified as 2.5G systems—have been introduced for the transmission of data, and the Enhanced Data Rates for GSM Evolution (EDGE) standard has been developed as an enhancement for the transmission rates in GSM systems. The introduction of the Universal Mobile Telecommunications System (UMTS) has established a third generation (3G) of mobile communication systems which particularly enables data driven services, such as video telephony and mobile broadband Internet access, for example. The UMTS standard has further been enhanced by the High Speed Packet Access (HSPA) and HSPA+standards. In the following, the term "2G/3G" will be used to denote any standard of a 2G or 3G system, including the ones mentioned above.

The Long Term Evolution (LTE) standard has been introduced as a fourth generation (4G) mobile communication system and has been enhanced by the LTE Advanced and LTE Advanced Pro standards. The next generation, i.e., the fifth generation (5G), of mobile communications systems is currently under development and generally aims at providing support for enhanced mobile broadband (e.g., for Ultra High Definition (UHD) and virtual presence), support for critical communication (e.g., for robot/drone and emergency communication), support for massive machine type communication (e.g., for e-health applications), support for enhanced network operation (e.g., network slicing and interworking) and support for vehicle-to-everything communication (e.g., for autonomous driving), for example. Much of the standardization work on the above-mentioned standards is and has been done by the 3rd Generation Partnership Project (3GPP).

For the ongoing standardization of 5G networks, there has been a general requirement that interworking with 2G/3G networks should not be taken into account in order to allow minimizing legacy aspects for 5G networks and to avoid the requirement of supporting direct interfaces between 5G networks and 2G/3G networks, for example. The assumption was that mobility between 5G networks and 2G/3G networks, if needed, would generally work via 4G networks, i.e., from 5G networks to 4G networks and then from 4G networks to 2G/3G networks, and vice versa. In practice, however, mobility may also occur directly between 5G networks and 2G/3G networks and, also, there may be restrictions which are unacceptable for some deployments which have not yet been discussed or investigated in detail, Direct mobility between 5G networks and 2G/3G networks may be required due to radio planning reasons of operators, or due to base stations being temporarily out of order, for example.

Figure 1:
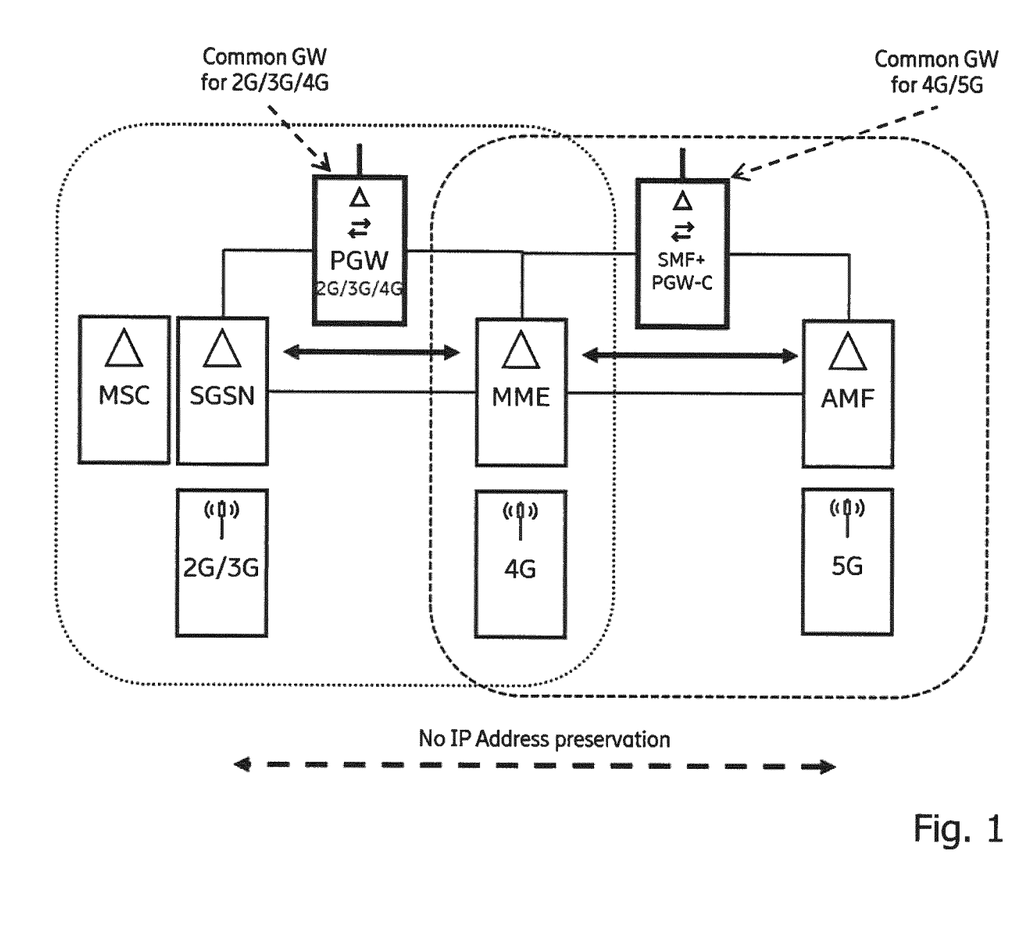
FIG. 1 illustrates an exemplary deployment scenario in which a legacy PGW acts as a common gateway serving a 2G/3G network and a 4G network and an SMF+PGW-C acts as a common gateway serving the 4G network and a 5G network.

As an example, it is referred to the deployment scenario illustrated in FIG. 1 in which a legacy Packet Data Network Gateway (PGW) acts as a common gateway serving the 2G/3G network as well as the 4G network and a Session Management Function+Packet Data Network Gateway-Control (SMF+PGW-C) entity acts as a common gateway supporting interworking between and serving the 4G network as well as the 5G network. When a UE moves from the 5G network to the 4G network and subsequently from the 4G network to the 2G/3G network in such a scenario, Internet Protocol (IP) address preservation may not be possible in general, so that the UE cannot generally keep its IP address during mobility between the 5G, 4G and 2G/3G networks. Rather, the UE may need to re-initiate respective sessions (e.g., a Packet Data Network (PDN) connection or a Protocol Data Unit (PDU) session through which the UE receives a service from the respective network) each time the UE moves from one network to another, possibly including performing initial IP Multimedia Subsystem (IMS) registrations including full authentication, for example. This may not only result in session breaks but also in additional load in the networks.

SUMMARY

Accordingly, there is a need for a technique which avoids one or more of the problems discussed above, or other problems.

According to a first aspect, a method for preparing UE mobility from a 4G network to a 2G/3G network for a UE moving from a 5G network to the 2G/3G network via the 4G network is provided. The method is performed by a network node after the UE has moved from the 5G network to the 4G network and comprises triggering, for each of one or more bearers handed over from the 5G network to the 4G network for the UE, an update bearer procedure to provide one or more 2G/3G Quality of Service (QoS) parameters to the UE required to hand over the respective bearer to the 2G/3G network when the UE moves from the 4G network to the 2G/3G network.

The one or more bearers may be handed over from one or more corresponding QoS flows of the 5G network (e.g., for each QoS flow associated with the UE in the 5G network, a corresponding bearer may be established in the 4G network) and, similarly, when moving from the 4G network to the 2G/3G network, the one or more bearers may be handed over to one or more corresponding Packet Data Protocol (PDP) contexts in the 2G/3G network (e.g., for each bearer associated with the UE in the 4G network, a corresponding PDP context may be established in the 2G/3G network). The one or more QoS flows may belong to a PDU session established between the UE and the 5G network and the one or more bearers may belong to a corresponding PDN connection established between the UE and the 4G network.

Since, when moving to the 2G/3G network, a PDP context may not be activated for the respective bearer if 2G/3G QoS parameters are not available to the UE for the respective bearer, providing the one or more 2G/3G QoS parameters to the UE prior to moving to the 2G/3G network may enable transferring the respective bearer into a PDP context of the 2G/3G network, as described above. Transferring the respective bearer into a corresponding PDP context may involve mapping a PDN address and Access Point Name (APN) associated with the respective bearer (i.e., an IP address and an APN associated with the PDN connection to which the respective bearer belongs) to a corresponding PDP address and APN associated with the newly established PDP context (i.e., an IP address and an APN associated with the new PDP context). IP address preservation may thus be enabled when moving between the 4G network and the 2G/3G network.

Triggering the update bearer procedure for the respective bearer may be conditionally performed when it is determined that 2G/3G QoS parameters have not yet been provided to the UE for the respective bearer. In other words, the fact that 2G/3G QoS parameters have not yet been provided to the UE for the respective bearer may be used as a condition for triggering the update bearer procedure so that triggering the update bearer procedure may only be performed when it is determined that 2G/3G QoS parameters have not yet been provided to the UE for the respective bearer. The network node may thus check whether 2G/3G QoS parameters have already been provided to the UE and, if not, the network node may trigger the update bearer procedure for every bearer that has been transferred from the 5G network to the 4G network. For example, the network node may store information on whether 2G/3G QoS parameters have already been provided to the UE and may then perform the check using the stored information. In another variant, another network node may store this information and the network node may obtain the information from that node.

In one implementation, the update bearer procedure may be an update bearer procedure with bearer QoS update. In other words, for providing the one or more 2G/3G QoS parameters to the UE, an existing update bearer procedure that is normally used to convey regular QoS updates (i.e., QoS updates that comprise 4G QoS parameters) for a bearer may be reused, the difference being that the present update bearer procedure may also be triggered when the regular bearer QoS parameters are in fact not changed. Triggering the update bearer procedure may thus be performed independently from whether QoS parameters for the one or more bearers have changed. In one variant, triggering the update bearer procedure for the respective bearer may include sending an update bearer request, wherein the update bearer request includes the one or more 2G/3G QoS parameters.

In order to be able to distinguish whether the update bearer request is used to convey regular QoS updates and/or to provide 2G/3G QoS parameters to the UE, the update bearer request may further include information indicating at least one of whether QoS parameters for the one or more bearers have changed and whether the update bearer request includes the one or more 2G/3G QoS parameters. This information may be provided in the form of a flag added to the update bearer request, for example, indicating that regular QoS parameters of the bearer (i.e., 4G QoS parameters) are not changed but that 2G/3G QoS parameters are added, or vice versa. A Radio Access Network (RAN) of the 4G network may use such information to avoid tearing down the respective bearer when the bearer QoS parameters have changed, and the UE may use such information to determine that the update bearer request is sent only to provide 2G/3G QoS parameters for enabling mobility to 2G/3G networks, for example. In other words, the information in the update bearer request may be used by the UE to determine whether the update bearer procedure is carried out to implement a bearer QoS update or to prepare the handover from the 4G network to the 2G/3G network.

The one or more 2G/3G QoS parameters may correspond to one or more "Release 99" (R99) QoS parameters, for example, and may include at least one of a traffic class, a delivery order, an indication of delivery of erroneous Service Data Units (SDUs), a maximum SDU size, a maximum bit rate for uplink, a maximum bit rate for downlink, a residual Bit Error Rate (BER), an SDU error ratio, a transfer delay, a traffic handling priority, an Allocation and Retention Priority (ARP), a guaranteed bit rate for uplink, and a guaranteed bit rate for downlink. The one or more 2G/3G QoS parameters may be mapped from one or more corresponding 4G QoS parameters, such as from one or more Evolved Packet System (EPS) bearer QoS parameters, for example. More specifically, each of the one or more 4G QoS parameters of the respective bearer may be mapped to a corresponding 2G/3G QoS parameter among the one or more 2G/3G QoS parameters.

In one variant, the one or more bearers handed over from the 5G network to the 4G network for the UE may comprise all bearers handed over from the 5G network to the 4G network for the UE. In another variant, the one or more bearers may only comprise bearers which can be handed over (e.g., which are mappable) to a PDP context in the 2G/3G network. Bearers which can be handed over to a PDP context in the 2G/3G network may be determined based on a limitation regarding a number of PDP contexts supported in the 2G/3G network, for example. Alternatively or additionally, bearers which can be handed over to a PDP context in the 2G/3G network may be determined based on a limitation regarding whether a secondary PDP context is supported in the 2G/3G network. The network node may thus only initiate the update bearer procedure for bearers that can be mapped to a PDP context in the 2G/3G network. The UE, in turn, may know that, if it did not receive 2G/3G QoS parameters for the respective bearer, this bearer is not to be transferred to the 2G/3G network.

For each of the one or more bearers, information indicating that 2G/3G QoS parameters have been provided to the UE for the respective bearer may be stored, wherein the stored information may be maintained when the respective bearer is handed over to at least one of the 2G/3G network and the 5G network. The network node may thus record for the respective bearer that 2G/3G QoS parameters have already been provided to the UE so that, when the UE moves between the 2G/3G, 4G and 5G networks, providing this information to the UE anew may be avoided.

The one or more bearers may be allocated on a common network entity that supports interworking between the 4G network and the 5G network, such as an SMF+PGW-C acting as common gateway for both the 4G and the 5G network, for example. The network node may in fact be the SMF+PGW-C, but it will be understood that the technique presented herein may be performed by any other appropriate network node as well, in particular a network node of the 4G network, such as a Mobility Management Entity (MME) or a Policy and Charging Rules Function (PCRF), for example. The common network entity, particularly the SMF+PGW-C, may have an interface to at least one of a Serving GPRS Support Node (SGSN) of the 2G/3G network (e.g., a Gn/Gp interface to the SGSN) and a Serving Gateway (SGW) of the 2G/3G network. In case of the SGW, the common network entity may have an S5/S8 interface to the SGW which, in turn, may have an S4 interface to the SGSN, for example.

The network node may be configured to keep track of the source access technology and the target access technology in the mobility scenario so that, depending on the particular source access technology and target access technology (e.g., respective Radio Access Technology (RAT) types), the network node may decide on triggering the update bearer procedure for the respective bearer, as described above. Mobility from the 5G network to the 4G network as well as from the 4G network to the 2G/3G network may involve an Inter Radio Access Technology (IRAT) handover, for example, but it will be understood that the technique presented herein may be employed in all other cases of UE mobility between the 5G network, the 4G network and the 2G/3G network as well. In either case, mobility may take place in both idle mode and connected mode. As an example, the technique may be applied to cases of idle mode mobility when the UE reselects the RAT or to cases of redirects, e.g., when the RAN directs the UE to a different RAN which employs a different RAT. A Next Generation RAN (NG-RAN) of a 5G network may direct the UE to an Evolved UMTS Terrestrial RAN (E-UTRAN) of a 4G network, for example.

According to a second aspect, a method for implementing UE mobility from a 4G network to a 2G/3G network for a UE moving from a 5G network to the 2G/3G network via the 4G network is provided. The method is performed by the UE after the UE has moved from the 5G network to the 4G network and comprises receiving, for each of one or more bearers, one or more 2G/3G QoS parameters from a network node as part of an update bearer procedure for the respective bearer and using the one or more 2G/3G QoS parameters to hand over the respective bearer to the 2G/3G network when the UE moves from the 4G network to the 2G/3G network.

The method according to the second aspect defines a method from the perspective of a UE which may be complementary to the method performed by the network node according to the first aspect. The UE and the network node of the second aspect may correspond to the UE and the network node described above in relation to the first aspect. As such, those aspects described with regard to the method of the first aspect which are applicable to the method of the second aspect may be comprised by the method of the second aspect as well, and vice versa. Unnecessary repetitions are thus omitted in the following.

As in the method of the first aspect, the update bearer procedure may be an update bearer procedure with bearer QoS update and the one or more 2G/3G QoS parameters may be included in an update bearer request received by the UE as part of the update bearer procedure. The update bearer request may further include information indicating at least one of whether QoS parameters for the one or more bearers have changed and whether the update bearer request includes the one or more 2G/3G QoS parameters, wherein the information may be used by the UE to determine whether the update bearer procedure is carried out to implement a bearer QoS update or to prepare the handover from the 4G network to the 2G/3G network.

According to a third aspect, a computer program product is provided. The computer program product comprises program code portions for performing the method of at least one of the first aspect and the second aspect when the computer program product is executed on one or more computing devices (e.g., a processor or a distributed set of processors). The computer program product may be stored on a computer readable recording medium, such as a semiconductor memory, DVD, CD-ROM, and so on.

According to a fourth aspect, a network node for preparing UE mobility from a 4G network to a 2G/3G network for a UE moving from a 5G network to the 2G/3G network via the 4G network is provided. The network node is configured to perform any of the method steps presented herein with respect to the first aspect. The network node may comprise at least one processor and at least one memory, wherein the at least one memory contains instructions executable by the at least one processor such that the network node is operable to perform any of the method steps presented herein with respect to the first aspect.

According to a fifth aspect, a UE for implementing UE mobility from a 4G network to a 2G/3G network is provided, wherein the UE moves from a 5G network to the 2G/3G network via the 4G network. The UE is configured to perform any of the method steps presented herein with respect to the second aspect. The UE may comprise at least one processor and at least one memory, wherein the at least one memory contains instructions executable by the at least one processor such that the UE is operable to perform any of the method steps presented herein with respect to the second aspect.

According to a sixth aspect, there is provided a system comprising a network node according to the fourth aspect and a UE according to the fifth aspect.

BRIEF DESCRIPTION OF THE DRAWINGS

Implementations of the technique presented herein are described herein below with reference to the accompanying drawings, in which.

DETAILED DESCRIPTION

In the following description, for purposes of explanation and not limitation, specific details are set forth in order to provide a thorough understanding of the present disclosure. It will be apparent to one skilled in the art that the present disclosure may be practiced in other embodiments that depart from these specific details.

Those skilled in the art will further appreciate that the steps, services and functions explained herein below may be implemented using individual hardware circuitry, using software functioning in conjunction with a programmed microprocessor or general purpose computer, using one or more Application Specific Integrated Circuits (ASICs) and/or using one or more Digital Signal Processors (DSPs). It will also be appreciated that when the present disclosure is described in terms of a method, it may also be embodied in one or more processors and one or more memories coupled to the one or more processors, wherein the one or more memories are encoded with one or more programs that perform the steps, services and functions disclosed herein when executed by the one or more processors.

Figure 2A:
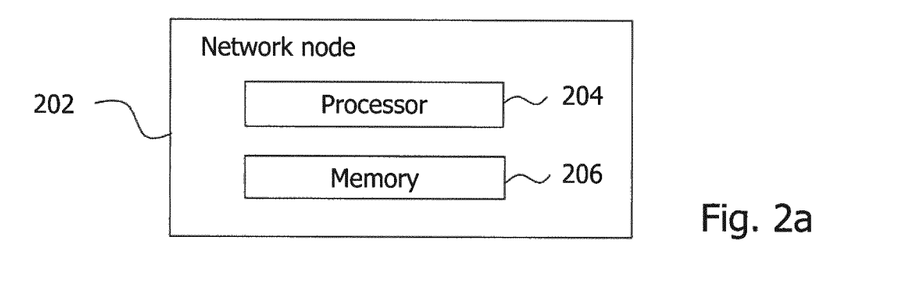
FIGS. 2a and 2b illustrate exemplary compositions of a network node and a UE according to the present disclosure.

FIG. 2a schematically illustrates an exemplary composition of a network node 202 for preparing UE mobility from a 4G network to a 2G/3G network for a UE moving from a 5G network to the 2G/3G network via the 4G network. The network node 202 comprises at least one processor 204 and at least one memory 206, wherein the at least one memory 206 contains instructions executable by the at least one processor 204 such that the network node 202 is operable to carry out the method steps described herein below.

It will be understood that the network node 202 may be implemented as a physical computing unit as well as in the form of a function or a virtualized computing unit, such as a virtual machine, for example. It will further be appreciated that the network node 202 may not necessarily be implemented as a standalone computing unit, but may be implemented as components—realized in software and/or hardware—residing on multiple distributed computing units as well, such as in a cloud computing environment, for example.

Figure 2B:
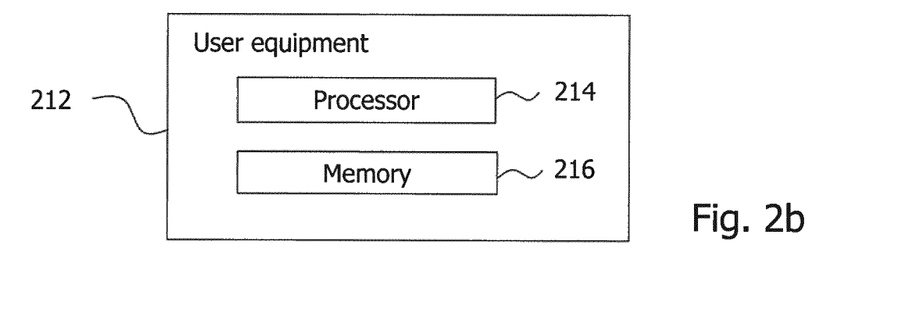

FIG. 2b schematically illustrates an exemplary composition of a UE 212 for implementing UE mobility from the 4G network to the 2G/3G network, wherein the UE 212 moves from the 5G network to the 2G/3G network via the 4G network. The UE 212 comprises at least one processor 214 and at least one memory 216, wherein the at least one memory 216 contains instructions executable by the at least one processor 214 such that the UE 212 is operable to carry out the method steps described herein below.

Figure 3A:
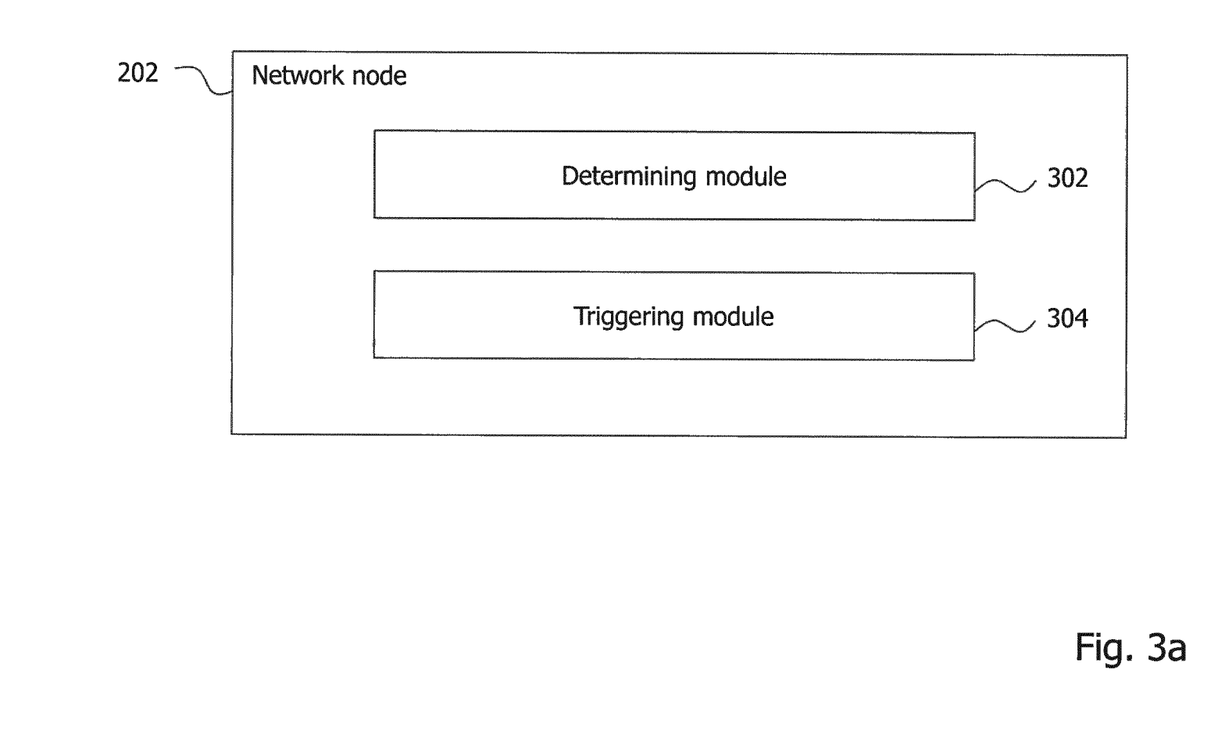
FIGS. 3a and 3b illustrate a modular composition of the network node and a corresponding method embodiment which may be performed by the network node.
Figure 3B:
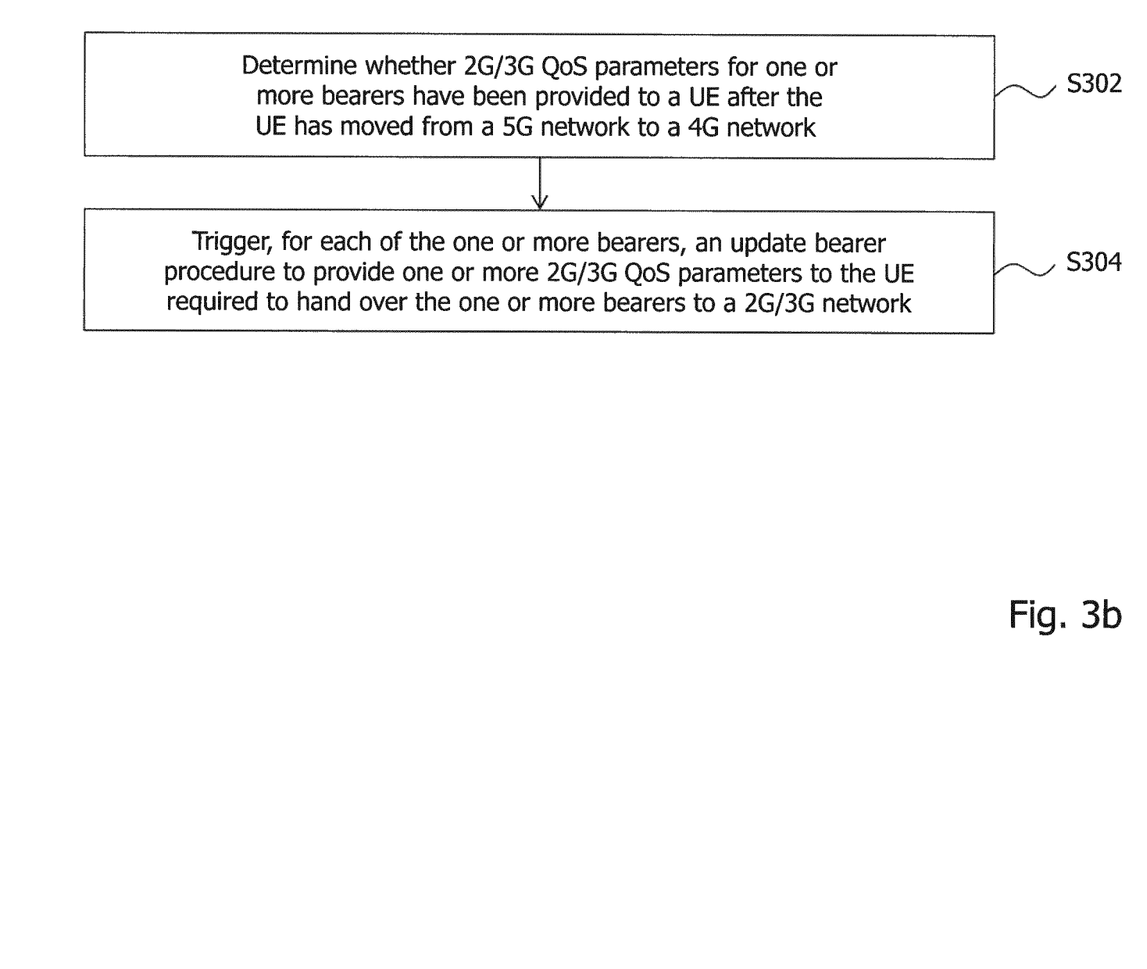

FIG. 3a schematically illustrates an exemplary modular composition of the network node 202 and FIG. 3b illustrates a corresponding method which may be performed by the network node 202. The basic operation of the network node 202 will be described in the following with reference to both FIGS. 3a and 3b.

In step S302, a determining module 302 of the network node 202 may determine whether 2G/3G QoS parameters for one or more bearers have been provided to the UE 212 after the UE 212 has moved from the 5G network to the 4G network. If it is determined that 2G/3G QoS parameters have not yet been provided to the UE 212 for the one or more bearers, a triggering module 304 of the network node 202 may trigger, in step S304, for each of the one or more bearers, an update bearer procedure to provide one or more 2G/3G QoS parameters to the UE 212 required to hand over the one or more bearers to the 2G/3G network.

The one or more bearers may be handed over from one or more corresponding QoS flows of the 5G network (e.g., for each QoS flow associated with the UE 212 in the 5G network, a corresponding bearer may be established in the 4G network) and, similarly, when moving from the 4G network to the 2G/3G network, the one or more bearers may be handed over to one or more corresponding PDP contexts in the 2G/3G network (e.g., for each bearer associated with the UE 212 in the 4G network, a corresponding PDP context may be established in the 2G/3G network). The one or more QoS flows may belong to a PDU session established between the UE 212 and the 5G network and the one or more bearers may belong to a corresponding PDN connection established between the UE 212 and the 4G network.

Since, when moving to the 2G/3G network, a PDP context may not be activated for the respective bearer if 2G/3G QoS parameters are not available to the UE 212 for the respective bearer, providing the one or more 2G/3G QoS parameters to the UE 212 prior to moving to the 2G/3G network may enable transferring (i.e., handing over or "moving") the respective bearer into a PDP context of the 2G/3G network, as described above. Transferring the respective bearer into a corresponding PDP context may involve mapping a PDN address and APN associated with the respective bearer (i.e., an IP address and an APN associated with the PDN connection to which the respective belongs) to a corresponding PDP address and APN associated with the newly established PDP context (i.e., an IP address and an APN associated with the new PDP context). IP address preservation may thus be enabled when moving between the 4G network and the 2G/3G network.

As indicated above, triggering the update bearer procedure for the respective bearer may be conditionally performed when it is determined, in step S302, that 2G/3G QoS parameters have not yet been provided to the UE 212 for the respective bearer. In other words, the fact that 2G/3G QoS parameters have not yet been provided to the UE 212 for the respective bearer may be used as a condition for triggering the update bearer procedure so that triggering the update bearer procedure may only be performed when it is determined that the 2G/3G QoS parameters have not yet been provided to the UE 212 for the respective bearer. The network node 202 may thus check whether 2G/3G QOS parameters have already been provided to the UE 212 and, if not, the network node 202 may trigger the update bearer procedure for every bearer that has been transferred from the 5G network to the 4G network.

In one implementation, the update bearer procedure may be an update bearer procedure with bearer QoS update. In other words, for providing the one or more 2G/3G QoS parameters to the UE, an existing update bearer procedure that is normally used to convey regular QoS updates (i.e., QoS updates that comprise 4G QoS parameters) for a bearer may be reused, the difference being that the present update bearer procedure may also be triggered when the regular bearer QoS parameters are in fact not changed. Triggering the update bearer procedure may thus be performed independently from whether QoS parameters for the one or more bearers have changed. In one variant, triggering the update bearer procedure for the respective bearer may include sending an update bearer request, wherein the update bearer request includes the one or more 2G/3G QoS parameters.

In order to be able to distinguish whether the update bearer request is used to convey regular QoS updates and/or to provide 2G/3G QoS parameters to the UE, the update bearer request may further include information indicating at least one of whether QoS parameters for the one or more bearers have changed and whether the update bearer request includes the one or more 2G/3G QoS parameters. This information may be provided in the form of a flag added to the update bearer request, for example, indicating that regular QoS parameters of the bearer (i.e., 4G QoS parameters) are not changed but that 2G/3G QoS parameters are added, or vice versa. An RAN of the 4G network may use such information to avoid tearing down the respective bearer when the bearer QoS parameters have changed, and the UE 212 may use such information to determine that the update bearer request is sent only to provide 2G/3G QoS parameters for enabling mobility to 2G/3G networks, for example. In other words, the information in the update bearer request may be used by the UE 212 to determine whether the update bearer procedure is carried out to implement a bearer QoS update or to prepare the handover from the 4G network to the 2G/3G network.

The one or more 2G/3G QoS parameters may correspond to one or more R99 QoS parameters, for example, and may include at least one of a traffic class, a delivery order, an indication of delivery of erroneous SDNs, a maximum SDU size, a maximum bit rate for uplink, a maximum bit rate for downlink, a residual BER, and SDU error ratio, a transfer delay, a traffic handling priority, an ARP, a guaranteed bit rate for uplink, and a guaranteed bit rate for downlink. The one or more 2G/3G QoS parameters may be mapped from one or more corresponding 4G QoS parameters, such as from one or more EPS bearer QoS parameters, for example. More specifically, each of the one or more 4G QoS parameters of the respective bearer may be mapped to a corresponding 2G/3G QoS parameter among the one or more 2G/3G QoS parameters.

In one variant, the one or more bearers handed over from the 5G network to the 4G network for the UE 212 may comprise all bearers handed over from the 5G network to the 4G network for the UE 212. In another variant, the one or more bearers may only comprise bearers which can be handed over (e.g., which are mappable) to a PDP context in the 2G/3G network. Bearers which can be handed over to a PDP context in the 2G/3G network may be determined based on a limitation regarding a number of PDP contexts support in the 2G/3G network, for example. Alternatively or additionally, bearers which can be handed over to a PDP context in the 2G/3G network may be determined based on a limitation regarding whether a secondary PDP context is supported in the 2G/3G network. The network node 202 may thus only initiate the update bearer procedure for bearers that can be mapped to a PDP context in the 2G/3G network. The UE 212, in turn, may know that, if it did not receive 2G/3G QoS parameters for the respective bearer, this bearer is not to be transferred to the 2G/3G network.

For each of the one or more bearers, information indicating that 2G/3G QoS parameters have been provided to the UE 212 for the respective bearer may be stored, wherein the stored information may be maintained when the respective bearer is handed over to at least one of the 2G/3G network and the 5G network. The network node 202 may thus record for the respective bearer that 2G/3G QoS parameters have already been provided to the UE 212 so that, when the UE 212 moves between the 2G/3G, 4G and 5G networks, providing this information to the UE 212 anew may be avoided.

The one or more bearers may be allocated on a common network entity that supports interworking between the 4G network and the 5G network, such as an SMF+PGW-C acting as common gateway for both the 4G and the 5G network, for example. The network node 202 may in fact be the SMF+PGW-C, but it will be understood that the technique presented herein may be performed by any other appropriate network node as well, in particular a network node of the 4G network, such as an MME or a PCRF, for example. The common network entity, particular the SMF+PGW-C, may have an interface to at least one of an SGSN of the 2G/3G network (e.g., a Gn/Gp interface to the SGSN) and an SGW of the 2G/3G network. In case of the SGW, the common network entity may have an S5/S8 interface to the SGW which, in turn, may have an S4 interface to the SGSN, for example.

The network node 202 may be configured to keep track of the source access technology and the target access technology in the mobility scenario so that, depending on the particular source access technology and target access technology (e.g., respective RAT types), the network node 202 may decide on triggering the update bearer procedure for the respective bearer, as described above. Mobility from the 5G network to the 4G network as well as from the 4G network to the 2G/3G network may involve an IRAT handover, for example, but it will be understood that the technique presented herein may be employed in all other cases of UE mobility between the 5G network, the 4G network and the 2G/3G network as well. In either case, mobility may take place in both idle mode and connected mode. As an example, the technique may be applied to cases of idle mode mobility when the UE reselects the RAT or to cases of redirects, e.g., when the RAN directs the UE to a different RAN which employs a different RAT. An NG-RAN of a 5G network may direct the UE to an E-UTRAN of a 4G network, for example.

Figure 4A:
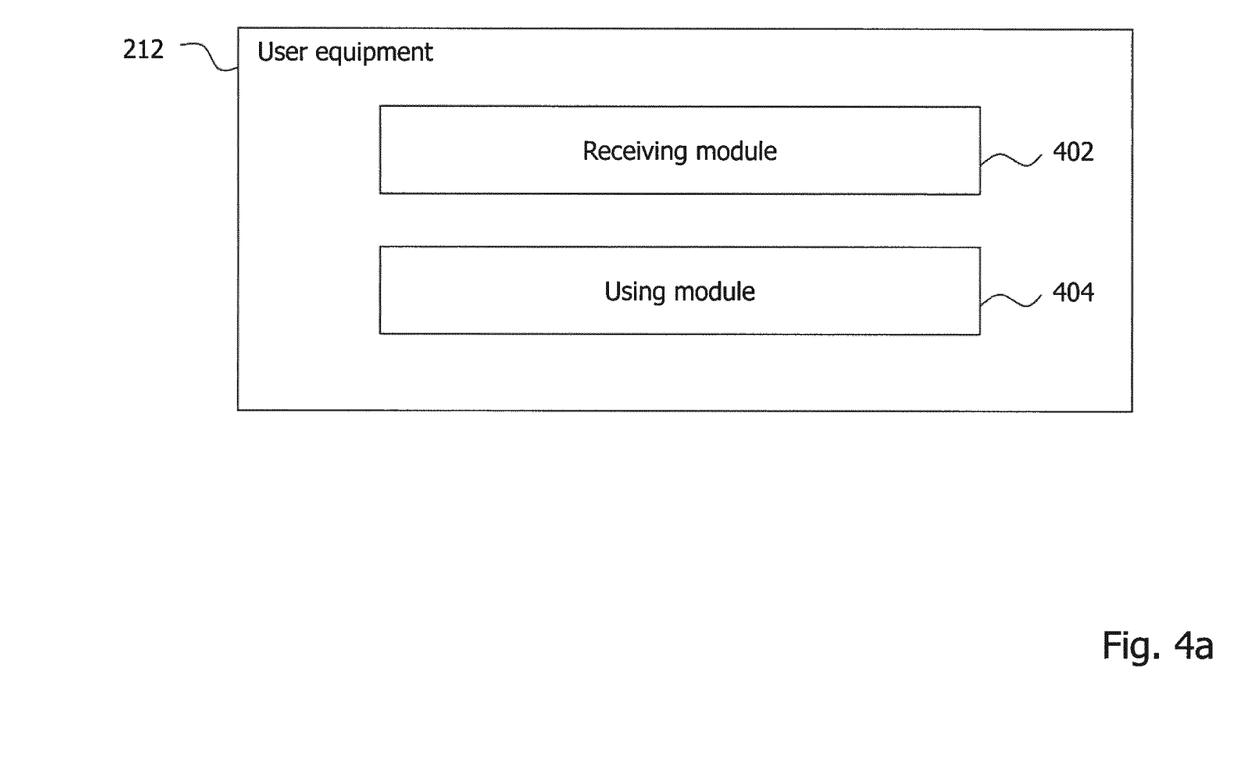
FIGS. 4a and 4b illustrate a modular composition of the UE and a corresponding method embodiment which may be performed by the UE.
Figure 4B:
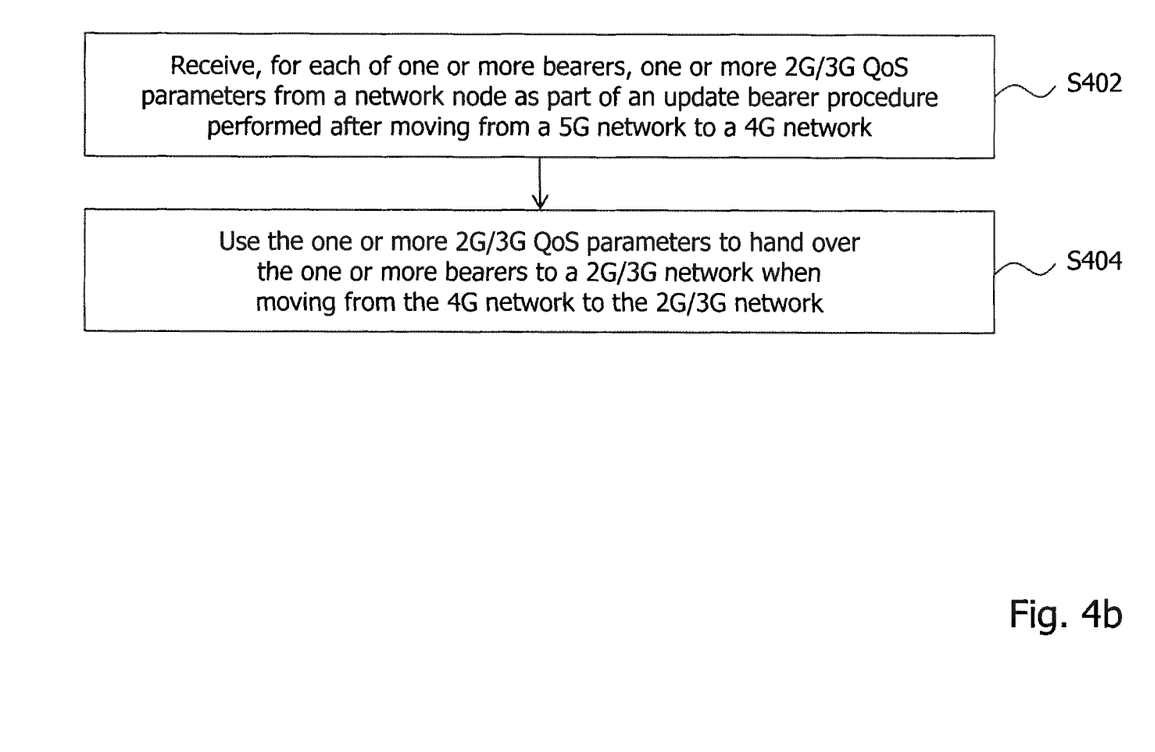

FIG. 4a schematically illustrates an exemplary modular composition of the UE 212 and FIG. 4b illustrates a corresponding method which may be performed by the UE 212. The basic operation of the UE 212 will be described in the following with reference to both FIGS. 4a and 4b. This operation may be complementary to the operation of the network node 202 described above in relation to FIGS. 3a and 3b and, as such, aspects described above with regard to the operation of the UE 212 may be applicable to the operation of the UE 212 described in the following as well. Unnecessary repetitions are thus omitted.

In step S402, a receiving module 402 of the UE 212 may receive, for each of one or more bearers, one or more 2G/3G QoS parameters from a network node 202 as part of the update bearer procedure for the respective bearer after the UE 212 has moved from the 5G network to the 4G network. In step S404, a using module 404 of the UE 212 may use the one or more 2G/3G QoS parameters to hand over the respective bearer to the 2G/3G network when the UE 212 moves from the 4G network to the 2G/3G network.

As described above, the update bearer procedure may be an update bearer procedure with bearer QoS update and the one or more 2G/3G QoS parameters may be included in an update bearer request received by the UE 212 as part of the update bearer procedure. The update bearer request may further include information indicating at least one of whether QoS parameters for the one or more bearers have changed and whether the update bearer request includes the one or more 2G/3G QoS parameters, wherein the information may be used by the UE 212 to determine whether the update bearer procedure is carried out to implement a regular bearer QoS update or to prepare the hand over from the 4G network to the 2G/3G network.

Figure 5:
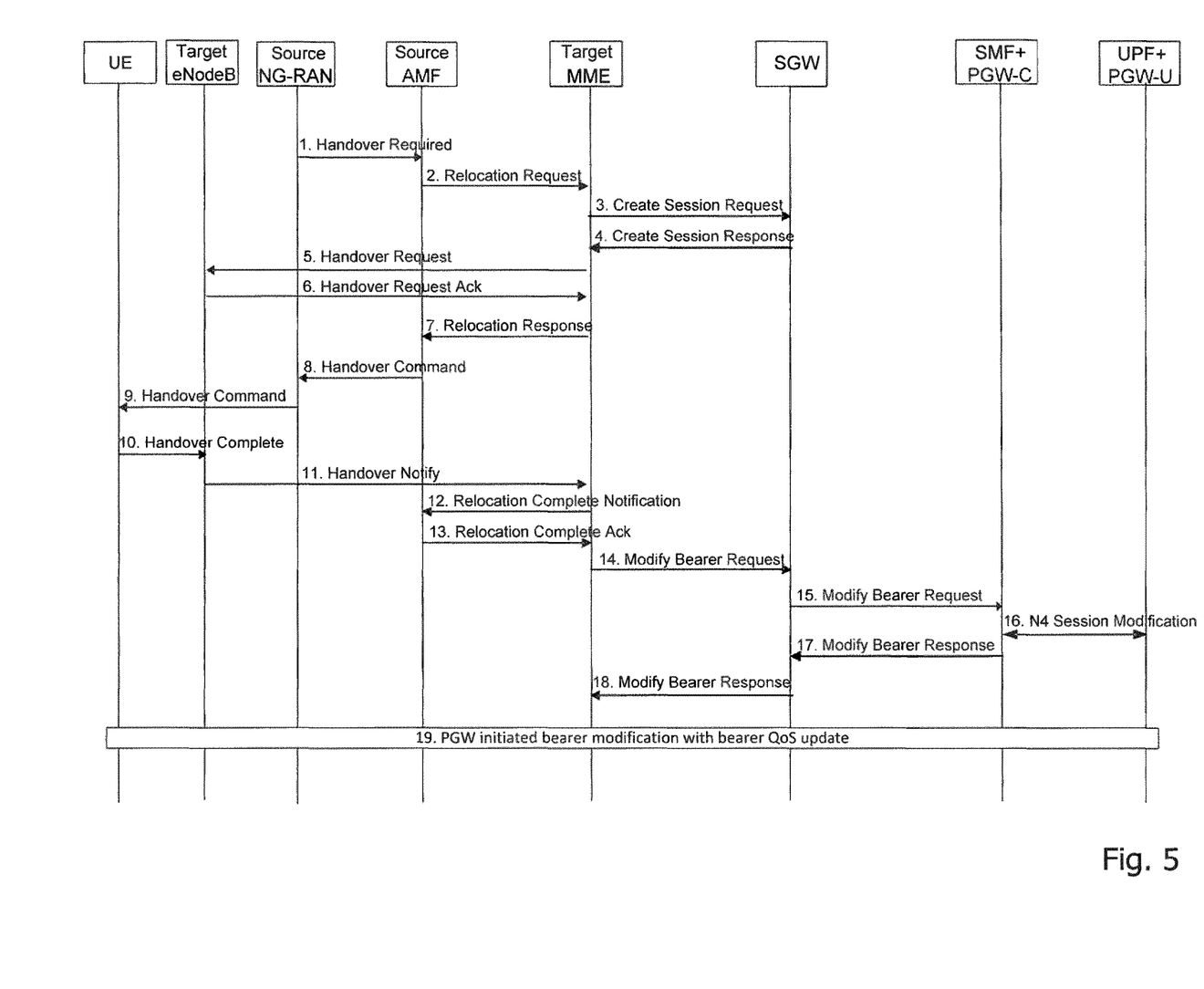
FIG. 5 illustrates a signaling diagram of an exemplary handover procedure from a 5G network to a 4G network according to the present disclosure.

FIG. 5 illustrates a signaling diagram of an exemplary handover procedure from a 5G network to a 4G network (5GS to EPS handover) using an N26 interface that enables interworking between an MME of the 4G network and an Access and Mobility Function (AMF) of the 5G network. It will be understood that this procedure is merely exemplary and that the technique presented herein may be employed in other cases of UE mobility from the 5G network to the 4G network as well. It will further be understood that the procedure shown in FIG. 5 is simplified and mainly focuses on those aspects which are relevant for understanding the technique presented herein. In the following, entities denoted as "source" entity refer to entities of the 5G network and entities denoted as "target" entity refer to entities of the 4G network.

In step 1 of the procedure, the source NG-RAN decides that the UE should be handed over to the target eNodeB and sends a Handover Required message to the source AMF. The source AMF then sends, in step 2, a Relocation Request message to the target MME informing the target MME of the desired handover. The target MME, in turn, sends a Create Session Request message to the SGW in step 3 and receives a corresponding Create Session Response message from the SGW in step 4. The target MME then sends, in step 5, a Handover Request message to the target eNodeB which responds with a Handover Request Acknowledgment message in step 6. Upon receipt of the acknowledgment, the target MME sends a Relocation Response message to the source AMF in step 7 which then sends a Handover Command message to the source NG-RAN in step 8. The source NG-RAN, in turn, commands the UE to handover to the target access network by sending a Handover Command and, upon performing the instructed handover, the UE sends a Handover Complete message to the target eNodeB in step 10. The target eNodeB then sends a Handover Notify message to the target MME in step 11 which, in turn, sends a Relocation Complete Notification to the source AMF in step 12. The source AMF acknowledges, in step 13, by sending a Relocation Complete Acknowledgment message to the target MME.

In step 14, the target MME informs the SGW that the target MME is now responsible for all bearers established for the UE by sending a Modified Bearer Request message to the SGW per PDN connection. The SGW then informs, in step 15, the SMF+PGW-C of the change by sending a Modified Bearer Request message per PDN connection itself. The SMF+PGW-C initiates, in step 16, an N4 Session Modification procedure towards the User Plane Function+ Packet Data Network Gateway-User (UPF+PGW-U) to update the user plane path accordingly. The mentioned Modify Bearer Request messages are then acknowledged from the SMF+PGW-C to the SGW in step 17, as well as from the SGW to the target MME in step 18. At this stage, the user plane path is established for all bearers between the UE, the target eNodeB, the SGW and the UPF+PGW-U. In step 19, the SMF+PGW-C then checks whether 2G/3G QoS parameters (e.g., R99 QoS parameters) have already been provided to the UE and, if not, the SMF+PGW-C triggers for every EPS bearer that has been transferred from the 5G network to the 4G network an update bearer procedure, as will be described in the following with reference to FIG. 6.

Figure 6:
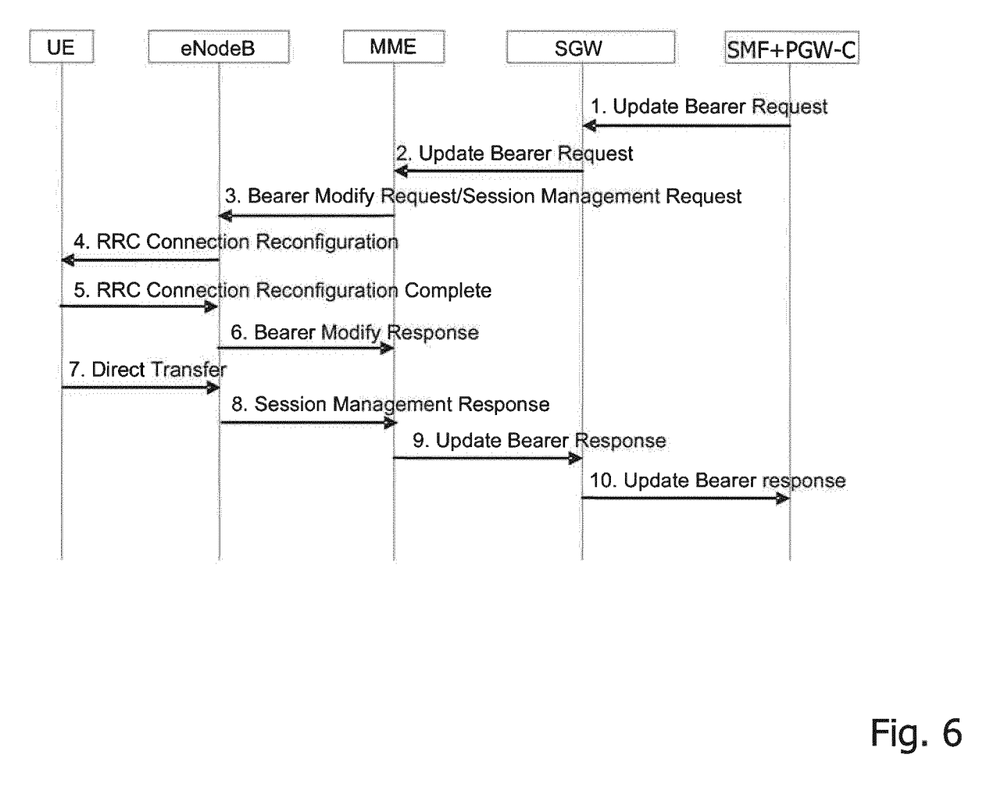
FIG. 6 illustrates a signaling diagram of an exemplary update bearer procedure with bearer QoS update according to the present disclosure.

FIG. 6 illustrates a signaling diagram of an exemplary update bearer procedure which, in the presented example, corresponds to a PGW initiated bearer modification procedure with bearer QoS update. In step 1 of the procedure, the SMF+PGW-C sends an Update Bearer Request message to the SGW. If the procedure is solely triggered for the purpose of providing 2G/3G QoS parameters to the UE, a flag may be added to the Update Bearer Request to indicate that regular QoS parameters are not changed, but that 2G/3G QoS parameters are added (it will be understood, however, that, in other variants, the flag could also indicate that regular QoS parameters are changed and that 2G/3G QoS parameters are provided in addition). In step 2, the SGW then sends a corresponding Update Bearer Request message to the MME which, in turn, sends a corresponding Bearer Modify Request message and a Session Management Request to the eNodeB in step 3. In the Bearer Modify Request message, the flag (e.g., indicating that regular QoS parameters are not changed, but that 2G/3G QoS parameters are added) is included. In step 4, the eNodeB signals a Radio Resource Control (RRC) Connection Reconfiguration message to the UE including the flag as well as the added 2G/3G QoS parameters. The UE receives the flag and the 2G/3G QoS parameters and stores the received parameters for later use when moving from the 4G network to a 2G/3G network to be able to activate PDP contexts in the 2G/3G network that correspond to the respective bearers established in the 4G network.

In step 5, the UE acknowledges the radio bearer modification by sending an RRC Connection Reconfiguration Complete message to the eNodeB, and the eNodeB acknowledges, in step 6, the bearer modification by sending a Bearer Modify Response message to the MME. The UE further sends a Direct Transfer message including a Session Management Response to the eNodeB in step 7 which, in turn, sends a corresponding Session Management Response message to the MME in step 8. Upon receipt of the Bearer Modify Response message in step 6 as well as the Session Management Response message in step 8, the MME acknowledges the bearer modification itself in step 9 by sending an Update Bearer Response message to the SGW. The SGW, in turn, acknowledges the bearer modification to the PGW by sending an Update Bearer Response message to the SMF+PGW-C in step 10.

As has become apparent from the above, the present disclosure provides a technique for preparing UE mobility from a 4G network to a 2G/3G network for a UE moving from a 5G network to the 2G/3G network via the 4G network. According to the technique, an update bearer procedure may be triggered for each of one or more bearers handed over from the 5G network to the 4G network for the UE in order to provide one or more 2G/3G QoS parameters which are required for (e.g., seamlessly) handing over the respective bearers to corresponding PDP contexts of the 2G/3G network when the UE moves from the 4G network to the 2G/3G network. Handing over the respective bearers to corresponding PDP contexts may involve mapping PDN addresses and APNs associated with the respective bearers to corresponding PDP addresses and APNs associated with the newly established PDP contexts, so that IP address preservation may be enabled between the 4G network and the 2G/3G network. The UE may thus keep its IP address during mobility among the 5G, 4G and 2G/3G networks and the need to re-initiate respective sessions (e.g., PDN or PDU sessions) each time the UE moves from one network to another, possibly including performing initial IMS registrations including full authentication, may be avoided. Corresponding load in the networks as well as session breaks including drop of packet connectivity may thus be prevented.

It is believed that the advantages of the technique presented herein will be fully understood from the foregoing description, and it will be apparent that various changes may be made in the form, constructions and arrangement of the exemplary aspects thereof without departing from the scope of the invention or without sacrificing all of its advantageous effects. Because the technique presented herein can be varied in many ways, it will be recognized that the invention should be limited only by the scope of the claims that follow.

The invention claimed is:

1. A method for preparing User Equipment, UE, mobility from a 4G network to a 2G/3G network for a UE moving from a 5G network to the 2G/3G network via the 4G network, the method being performed by a network node after the UE has moved from the 5G network to the 4G network, the method comprising:

triggering, for each of at least one bearer handed over from the 5G network to the 4G network for the UE, an update bearer procedure providing one or more 2G/3G Quality of Service, QoS, parameters to the UE to be used by the UE to hand over a respective bearer of the at least one bearer to the 2G/3G network when the UE moves from the 4G network to the 2G/3G network; and the triggering of the update bearer procedure for the respective bearer being conditionally performed when it is determined that the one or more 2G/3G QoS parameters have not yet been provided to the UE for the respective bearer.

2. The method of claim 1, wherein the update bearer procedure is an update bearer procedure with bearer QoS update.

3. The method of claim 2, wherein the triggering of the update bearer procedure is performed independently from whether the one or more 2Q/3G QoS parameters for the at least one bearer have changed.

4. The method of claim 1, wherein the triggering of the update bearer procedure for the respective bearer includes sending an update bearer request and wherein the update bearer request includes the one or more 2G/3G QoS parameters.

5. The method of claim 4, wherein the update bearer request further includes information indicating at least one of whether QoS parameters for the at least one bearer have changed and whether the update bearer request includes the one or more 2G/3G QoS parameters.

6. The method of claim 1, wherein the one or more 2G/3G QoS parameters are mapped from one or more corresponding 4G QoS parameters.

7. The method of claim 1, wherein the at least one bearer comprises all bearers handed over from the 5G network to the 4G network for the UE.

8. The method of claim 1, wherein the at least one bearer only comprise bearers which can be handed over to a Packet Data Protocol, PDP, context in the 2G/3G network.

9. The method of claim 8, wherein the bearers which can be handed over to a PDP context in the 2G/3G network are determined based on a limitation regarding a number of PDP contexts supported in the 2G/3G network.

10. The method of claim 8, wherein the bearers which can be handed over to a PDP context in the 2G/3G network are determined based on a limitation regarding whether a secondary PDP context is supported in the 2G/3G network.

11. The method of claim 1, wherein, for each of the at least one bearer, information indicating that 2G/3G QoS parameters have been provided to the UE for the respective bearer is stored, and wherein the stored information is maintained when the respective bearer is handed over to at least one of the 2G/3G network and the 5G network.

12. The method of claim 1, wherein the at least one bearer is allocated on a common network entity that supports interworking between the 4G network and the 5G network.

13. The method of claim 12, wherein the common network entity has an interface to at least one of a Serving General Packet Radio Service, GPRS, Support Node, SGSN, of the 2G/3G network and a Serving Gateway, SGW, of the 2G/3G network.

14. A method for implementing User Equipment, UE, mobility from a 4G network to a 2G/3G network for a UE moving from a 5G network to the 2G/3G network via the 4G network, the method being performed by the UE after the UE has moved from the 5G network to the 4G network, the method comprising:

receiving, for each of at least one bearer, a trigger to trigger an update bearer procedure for a respective bearer of the at least one bearer; and conditionally performing the update bearer procedure for the respective bearer when it is determined that one or more 2G/3G Quality of Service, QoS, parameters to hand over the respective bearer to the 2G/3G network have not yet been received for the respective bearer when the UE moves from the 4G network to the 2G/3G network.

15. The method of claim 14, wherein the update bearer procedure is an update bearer procedure with bearer QoS update.

16. The method of claim 14, wherein the one or more 2G/3G QoS parameters are included in an update bearer request received by the UE as part of the update bearer procedure.

17. The method of claim 16, wherein the update bearer request further includes information indicating at least one of whether QoS parameters for the at least one bearer have changed and whether the update bearer request includes the one or more 2G/3G QoS parameters.

18. The method of claim 17, wherein the information is used by the UE to determine whether the update bearer procedure is carried out to implement a bearer QoS update or to prepare the handover from the 4G network to the 2G/3G network.

19. A network node for preparing User Equipment, UE, mobility from a 4G network to a 2G/3G network for a UE moving from a 5G network to the 2G/3G network via the 4G network, the network node being configured to, after the UE has moved from the 5G network to the 4G network:

trigger, for each of at least one bearer handed over from the 5G network to the 4G network for the UE, an update bearer procedure providing one or more 2G/3G Quality of Service, QoS, parameters to the UE to be used by the UE to hand over a respective bearer of the at least one bearer to the 2G/3G network when the UE moves from the 4G network to the 2G/3G network; and the triggering of the update bearer procedure for the respective bearer being conditionally performed when it is determined that the one or more 2G/3G QoS parameters have not yet been provided to the UE for the respective bearer.

20. The network node of claim 19, comprising at least one processor and at least one memory, the at least one memory containing instructions executable by the at least one processor such that the network node is configured to perform the triggering.

21. A User Equipment, UE, for implementing UE mobility from a 4G network to a 2G/3G network, the UE moving from a 5G network to the 2G/3G network via the 4G network, the UE being configured to, after the UE has moved from the 5G network to the 4G network:

receive, for each of at least one bearer, a trigger to trigger an update bearer procedure for a respective bearer of the at least one bearer; and conditionally performing the update bearer procedure for the respective bearer when it is determined that one or more 2G/3G Quality of Service, QoS, parameters to hand over the respective bearer to the 2G/3G network have not yet been received for the respective bearer when the UE moves from the 4G network to the 2G/3G network.

22. The UE of claim 21, comprising at least one processor and at least one memory, the at least one memory containing instructions executable by the at least one processor such that the UE is configured to perform the receiving.

* * * * *